(12) United States Patent  
Kim

(10) Patent No.: US 7,967,327 B2  
(45) Date of Patent: Jun. 28, 2011

(54) KNEE PROTECTION DEVICE FOR VEHICLE

(75) Inventor: Eung Man Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 54 days.

(21) Appl. No.: 12/511,283

(22) Filed: Jul. 29, 2009

(65) Prior Publication Data

US 2010/0117342 A1     May 13, 2010

(30) Foreign Application Priority Data

Nov. 13, 2008    (KR) ........................ 10-2008-0112809

(51) Int. Cl.
*B60R 21/16* (2006.01)
(52) U.S. Cl. .................................................. 280/728.2
(58) Field of Classification Search ............... 280/730.1, 280/751, 752, 753, 728.2, 732
See application file for complete search history.

(56) References Cited

U.S. PATENT DOCUMENTS

| | | | | |
|---|---|---|---|---|
| 4,978,136 A | * | 12/1990 | Tomita et al. ................. | 280/751 |
| 6,039,380 A | * | 3/2000 | Heilig et al. .................... | 296/70 |
| 6,070,905 A | * | 6/2000 | Renault .......................... | 280/751 |
| 6,092,832 A | * | 7/2000 | Worrell et al. ............. | 280/728.2 |
| 6,155,594 A | * | 12/2000 | Ibe et al. ..................... | 280/728.2 |
| 6,170,871 B1 | * | 1/2001 | Goestenkors et al. ..... | 280/743.1 |
| 6,213,497 B1 | * | 4/2001 | Spencer et al. ............ | 280/730.1 |
| 6,357,957 B1 | * | 3/2002 | Champlin ..................... | 403/256 |
| 6,378,902 B2 | * | 4/2002 | Unger et al. .................. | 280/753 |
| 6,517,103 B1 | * | 2/2003 | Schneider .................. | 280/730.1 |
| 6,619,689 B2 | * | 9/2003 | Spencer et al. ............ | 280/730.1 |
| 6,758,493 B2 | * | 7/2004 | Conlee et al. ................. | 280/753 |
| 6,951,348 B2 | * | 10/2005 | Enders ....................... | 280/728.2 |
| 6,976,706 B2 | * | 12/2005 | Smith et al. ................... | 280/753 |
| 7,144,032 B2 | * | 12/2006 | Lunt et al. .................. | 280/728.2 |
| 7,322,598 B2 | * | 1/2008 | Galmiche et al. .......... | 280/730.1 |
| 7,552,519 B2 | * | 6/2009 | Enders ....................... | 280/728.2 |
| 7,810,837 B2 | * | 10/2010 | Thomas et al. ............ | 280/730.1 |

* cited by examiner

*Primary Examiner* — Paul N Dickson
*Assistant Examiner* — James English
(74) *Attorney, Agent, or Firm* — Morgan, Lewis & Bockius LLP

(57) ABSTRACT

A knee protection device for a vehicle includes a lower crash pad, a mounting unit and an inflation limit unit. The lower crash pad has an internal space communicating with an inflator and a rear surface formed to be folded by a plurality of creases. The lower crash pad is mounted to the lower end of an upper crash pad, and is inflated forwards while the rear surface is smoothed out in the explosion of the inflator, thus protecting a passenger's knees. The mounting unit is provided on the rear surface of the lower crash pad and coupled to a vehicle body. The inflation limit unit is connected between the front and rear surfaces of the lower crash pad, and limits the forward moving distance of the front surface from the rear surface when the lower crash pad inflates.

12 Claims, 5 Drawing Sheets

KNEE PROTECTION DEVICE FOR VEHICLE

CROSS-REFERENCE TO RELATED APPLICATIONS

The present application claims priority to Korean Patent Application Number 10-2008-0112809 filed Nov. 13, 2008, the entire contents of which application is incorporated herein for all purpose by this reference.

BACKGROUND OF THE INVENTION

1. Field of the Invention

The present invention relates to a knee protection device for a vehicle which is mounted to the lower crash pad of the vehicle and is deployed in the event of a crash, thus protecting the knees of a passenger.

2. Description of Related Art

Recently, vehicle consumers tend to purchase deluxe cars which afford convenience and guarantee safety. Further, as the automobile culture has become widely established, people desire to utilize their cars as a multi-purpose space as well as a transport means. Such a desire also leads to a trend toward deluxe cars. Because of such a trend, a passenger side airbag, a side impact airbag and a knee airbag for protecting a driver's knees have been developed, in addition to a driver's side airbag that is the original type of airbag. A deluxe car market already has adopted the above-mentioned airbags.

Various airbag technologies are applied according to the passenger's body part to be protected. When a head-on car crash occurs with a driver wearing a seat belt and an airbag installed in a car, an injury to the legs is the most frequent. Thus, the knee airbag is mounted to an instrument panel inside the knee region of a driver's seat or a front passenger's seat, so that the knee airbag is deployed simultaneously with the front airbag in the event of a head-on car crash, thus protecting the knees, reducing load acting on the thighs, quickly restraining the knees and improving the passenger's positioning in preparation for impact, thereby reducing the injury to the breast and head and preventing his or her body from being released from the seat belt, namely, preventing a submarine. Further, in the event of an offset crash, the knee airbag may prevent the knees from being injured due to a collision with a steering column.

FIG. 1 is a sectional view illustrating a conventional knee protection device for a vehicle. As shown in the drawing, the knee protection device is provided to protect a passenger's knees aside from a knee airbag, and comprises a knee bolster 30 which is mounted inside a lower crash pad 20 on the lower end of a steering column 10. The conventional knee bolster 30 is installed inside the lower crash pad 20, thus absorbing shocks when a passenger's knees collide with the lower crash pad 20.

Meanwhile, the airbag structure may be applied to the knee bolster. That is, in the event of a vehicle crash, the knee bolster inflates to actively absorb shocks. However, while the knee bolster is inflating, the lower crash pad may undesirably strike a passenger's knees, thus injuring the knees.

That is, when the knee bolster is used in the same manner as the airbag in addition to the knee airbag, the lower crash pad strikes the knees, so that shocks are not efficiently absorbed, and instead a passenger may suffer from a secondary injury.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a knee protection device for a vehicle, which limits the inflation of a knee bolster, thus preventing a lower crash pad from striking a passenger's knees in the event of a crash and thereby protecting the passenger from a secondary injury.

In some aspects of the present invention, the knee protection device for a vehicle, may include a lower crash pad including an internal space enclosed by a front surface and a rear surface, the internal space communicating with an inflator, wherein the rear surface is formed to be folded by a plurality of creases, and the front surface is configured to be inflated forwards while the rear surface is smoothed out with unfolding of the creases in an explosion of the inflator, thus protecting a passenger's knees, a mounting unit provided on the rear surface of the lower crash pad and coupled to a vehicle body, and an inflation limit unit connected between the front surface and the rear surface of the lower crash pad, and limiting a forward moving distance of the front surface from the rear surface when the lower crash pad inflates.

The plurality of creases may be formed on an upper portion of the rear surface.

The rear surface may have a predetermined curvature so that the lower crash pad is inflated forwards in a fan shape when the inflator explodes, wherein the front surface of the lower crash pad is formed to have a predetermined curvature.

The front surface of the lower crash pad may be formed to have a predetermined curvature.

The lower crash pad may be mounted to a lower end of an upper crash pad.

The lower crash pad may be made up of thermoplastic elastomer.

The inflator and the mounting unit may be mounted to a rear portion of the rear surface.

The inflation limit unit may include an insert member, a first end of which is fastened to the front surface and a second end of which is inserted into and adjustably mounted to the rear surface, and a stopper provided on the second end of the insert member and limiting an inflation thickness between the front and rear surfaces of the lower crash pad.

The mounting unit may include a support panel installed to be in close contact with the rear surface of the lower crash pad, and a locking bracket coupling the support panel to the vehicle body.

At least a locking bracket may be provided on each of opposite sides of the support panel and coupled to the vehicle body.

The inflation limit unit may include a rod-shaped insert member, a first end of which is fastened to the front surface and a second end of which passes through the rear surface and the support panel of the lower crash pad and mounted to the support panel, and a stopper adjustably fastened to the second end of the insert member in a screw-type fastening method, and stopped by the support panel when the lower crash pad is inflated, thus limiting an inflation thickness between the front and rear surfaces.

The plurality of creases may be provided on an upper portion of the rear surface of the lower crash pad, a lower portion of the rear surface is formed in a stepped shape, the support panel is formed in a stepped shape and is in close contact with the lower portion of the rear surface, and the locking bracket is installed to be in close contact with the support panel, with an end of the locking bracket being formed in a stepped shape corresponding to the stepped shape of the support panel.

A sound absorbing panel may be provided between the support panel and the locking bracket so as to prevent noise from being generated Upper and lower fitting protrusions each having a locking groove may be provided on the support panel and pass through corresponding upper and lower fitting holes of the locking bracket, and a spring is installed between the upper and lower fitting protrusions and is supported and pulled at each of opposite ends thereof by the locking groove, thus coupling the support panel with the locking bracket.

A locking hook may be provided at a position around each of the fitting holes of the locking bracket, and an end of the spring is supported and pulled by the locking groove of each of the fitting protrusions and the locking hook.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
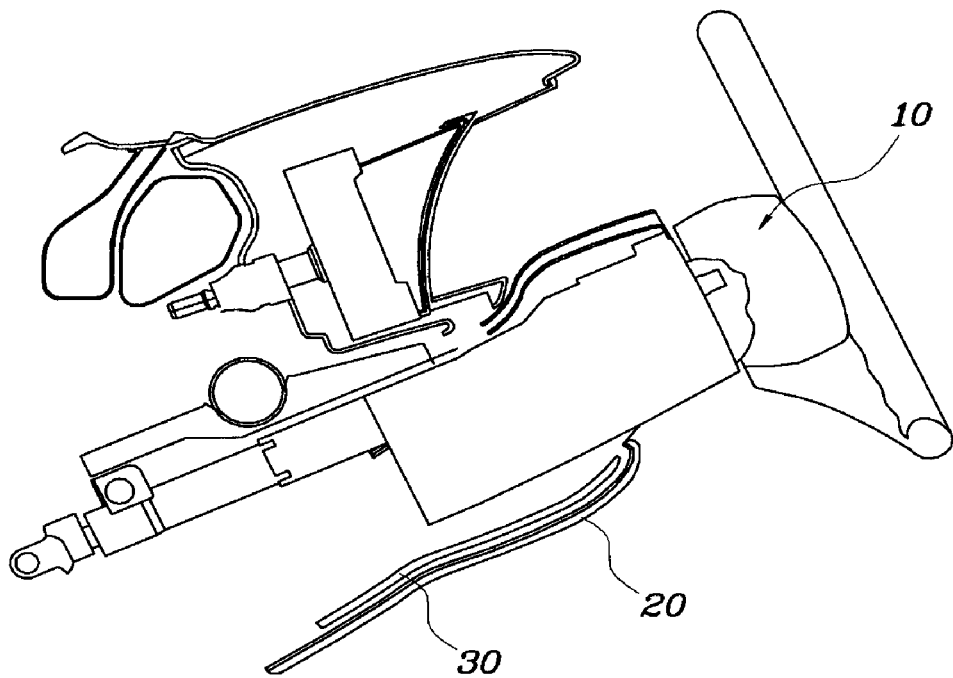
FIG. 1 is a sectional view illustrating a conventional knee protection device for a vehicle.
Figure 2:
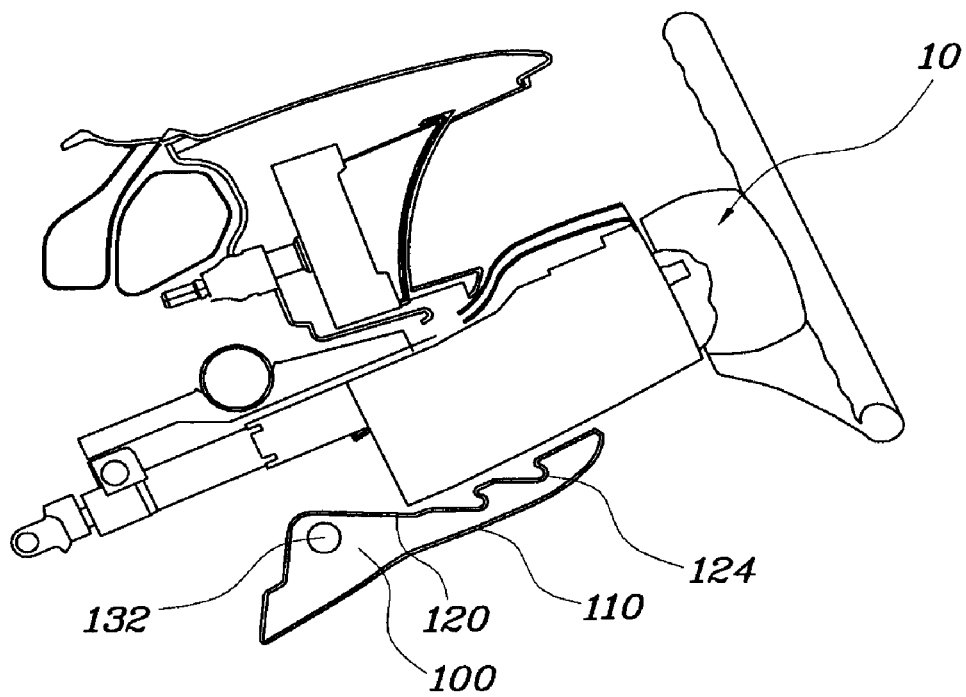
FIG. 2 is a sectional view illustrating an exemplary knee protection device for a vehicle according to the present invention.

FIG. 2 is a sectional view illustrating a knee protection device for a vehicle according to various embodiments of the present invention. The knee protection device for the vehicle according to various embodiments of the present invention includes a lower crash pad 100, a mounting unit and an inflation limit unit 700. The lower crash pad 100 has an internal space which communicates with an inflator 132. A rear surface 120 is formed to be folded by a plurality of creases 124. The lower crash pad 100 is mounted to the lower end of an upper crash pad and inflated forwards while the rear surface 120 is smoothed out in the explosion of the inflator 132, thus protecting a passenger's knees. The mounting unit is provided on the rear surface 120 of the lower crash pad 100 and coupled to a vehicle body 60. The inflation limit unit 700 is connected between the front surface 110 and the rear surface 120 of the lower crash pad 100, and limits the forward moving distance of the front surface 110 from the rear surface 120 when the lower crash pad 100 inflates.

The lower crash pad 100 has the internal space, with the inflator 132 installed to blow gas into the internal space and thereby inflate the lower crash pad 100. As shown in the drawing, the lower crash pad 100 is mounted to the lower end of a steering column 10, with the rear surface 120 creased. The inflator 132 explodes in response to a signal of a control unit in the event of a crash, and the back and front surfaces 120 and 110 of the lower crash pad 100 are inflated by the gas released from the inflator 132 while expanding towards a passenger's knees. The lower crash pad 100 must be made of rubber-based plastics which are relatively easy to form and maintain a proper strength. The reason is because the lower crash pad 100 must maintain its form to serve as the inner panel of the vehicle at normal times, but must inflate to absorb shocks applied to the knees in the event of a crash. The lower crash pad 100 is made of thermoplastic elastomer (TPE). Among the thermoplastic elastomer, thermoplastic olefinic elastomer (TPO) is preferable. Further, the basic shape of FIG. 2 may be obtained through blow molding.

Figure 3:
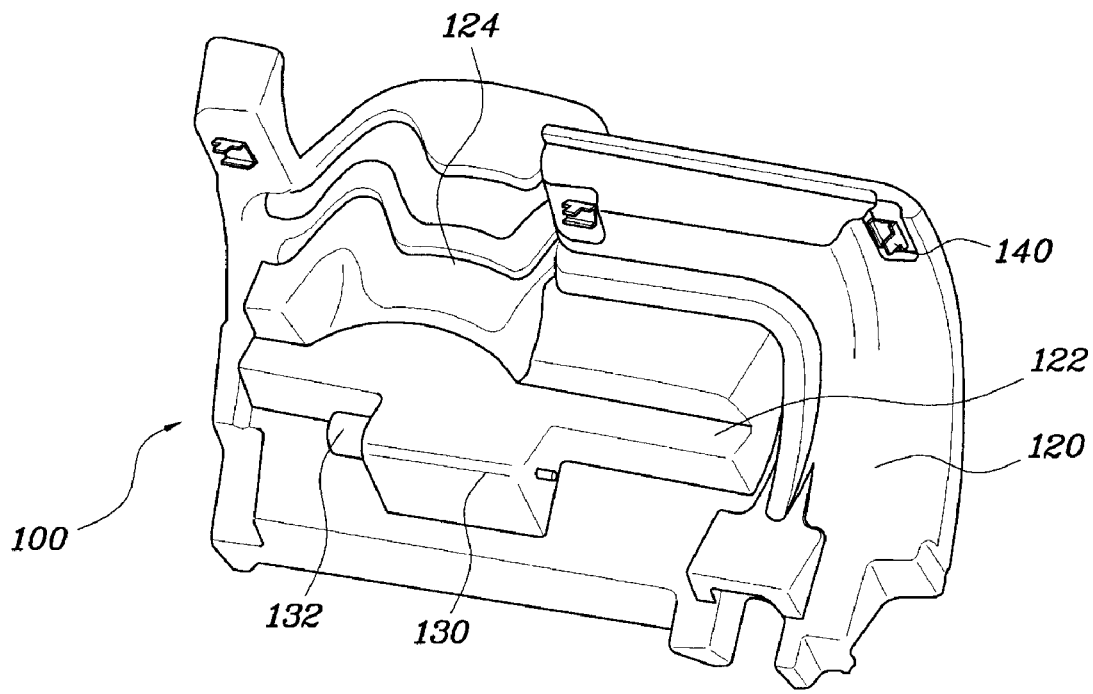
FIG. 3 is a rear perspective view illustrating the lower crash pad of the knee protection device for the vehicle shown in FIG. 2.

FIG. 3 is a perspective view illustrating the rear surface of the lower crash pad. The creases 124 are formed on the upper portion of the rear surface 120 of the lower crash pad 100, and the inflator 132 and the mounting unit are mounted to the lower portion of the rear surface 120.

In various embodiments of the present invention, the rear surface 120 may have a predetermined curvature. Thus, when the inflator 132 explodes, the creases 124 of the lower crash pad 100 are smoothed out and simultaneously the lower crash pad 100 is inflated forwards in a fan shape.

Further, the lower portion of the rear surface 120 is formed to have the shape of steps 122, and a protruding part 130 is provided on the lower portion of the rear surface 120 so that the inflator 132 is mounted to the protruding part 130. Locking clips 140 are provided on the upper end of the rear surface 120, so that the lower crash pad 100 is locked to the lower end of the upper crash pad by the locking clips 140 at normal times. Meanwhile, when the lower crash pad 100 inflates, the lower crash pad 100 is released from the upper crash pad, so that the lower crash pad 100 may inflate forwards.

The mounting unit for mounting the lower crash pad 100 to the vehicle body 60 includes a support panel 300, a sound absorbing panel 400, a locking bracket 500 and a spring 600. According to the exemplary embodiments illustrated in the drawings, a pair of sound absorbing panels 400, a pair of locking brackets 500 and 500' and a pair of springs 600 and 600' are provided on both sides of one support panel 300.

Since the sound absorbing panels 400, the locking brackets 500 and 500' and the springs 600 and 600' provided on both sides of the support panel 300 are mounted in the same method, the mounting structure of only the sound absorbing panel 400, the locking bracket 500 and the spring 600 provided on one side of the support panel 300 will be described herein below.

Figure 4:
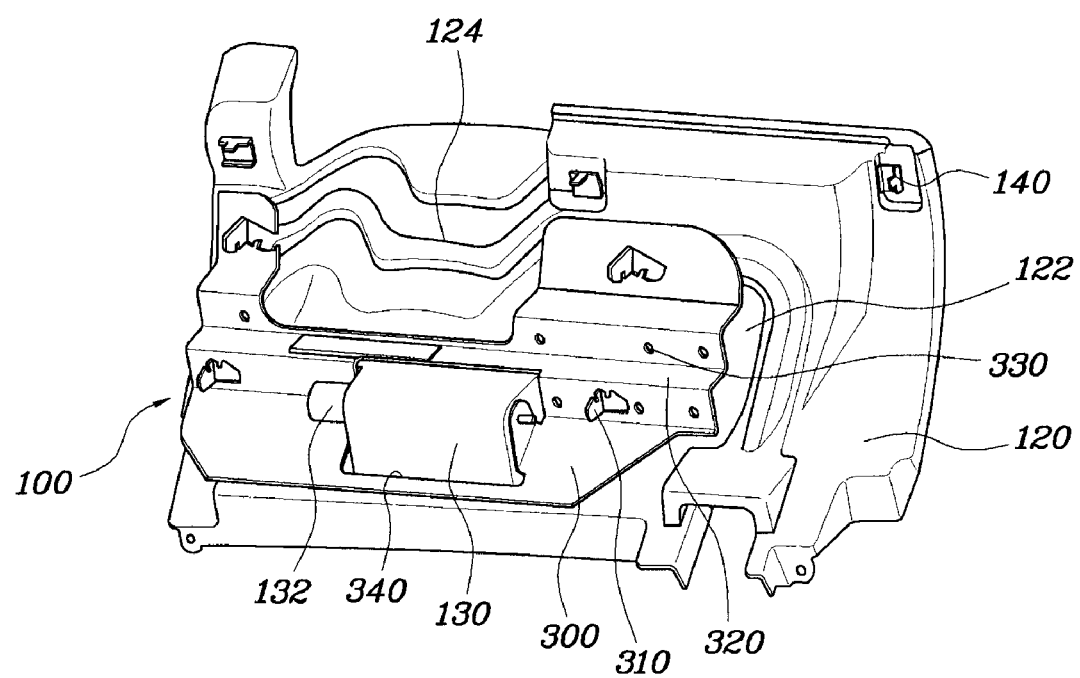
FIG. 4 is a perspective view illustrating the state in which a support panel is attached to the lower crash pad of FIG. 3.

FIG. 4 is a perspective view illustrating the state in which the support panel 300 is attached to the rear surface of the lower crash pad 100. The support panel 300 is installed to be in close contact with the rear surface 120 of the lower crash pad 100. In a detailed description, the support panel 300 is secured to the lower portion of the rear surface 120 of the lower crash pad 100, and is formed to have steps 320 which have the same shape as that of the steps 122 of the lower portion of the rear surface 120, so that the support panel 300 is in close contact with the rear surface 120. A through hole 340 is formed in the lower end of the support panel 300 so that the inflator 132 passes through the through hole 340, and fitting protrusions 310 are provided on the left, right, upper and lower portions of the support panel 300 to perform a locking operation. Further, the support panel 300 is locked to the lower crash pad 100 via a plurality of locking holes 330.

Figure 5:
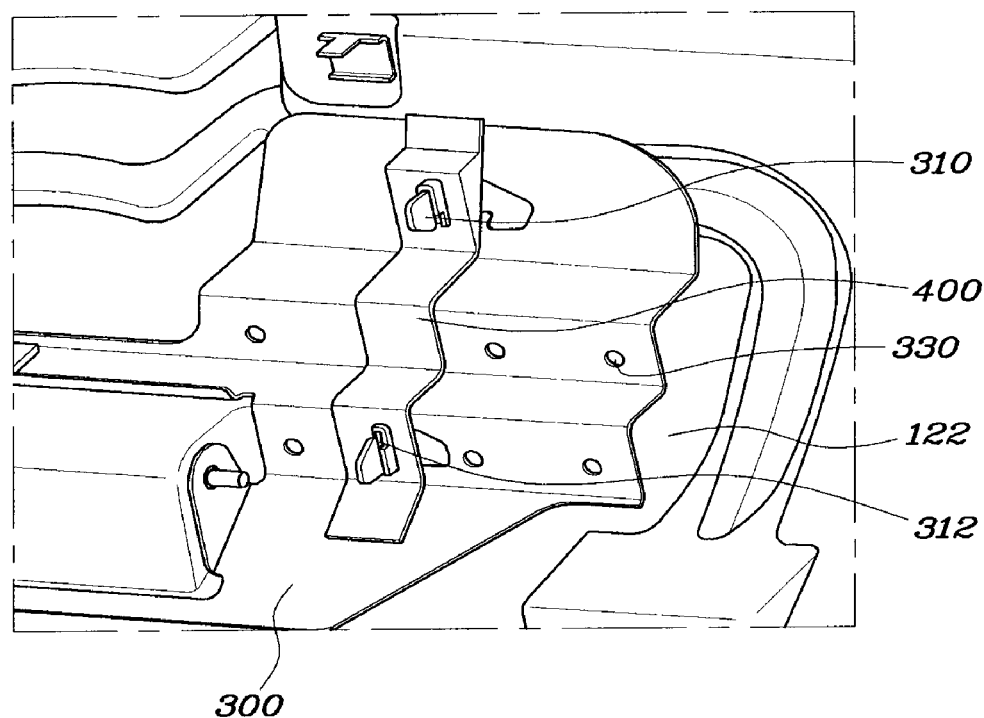
FIG. 5 is a perspective view illustrating the state in which a sound absorbing panel is coupled to the support panel of FIG. 4.

FIG. 5 is a perspective view illustrating the state in which the sound absorbing panel is coupled to the support panel. The sound absorbing panel 400 is provided between the support panel 300 and the locking bracket 500 to absorb noise and vibration therebetween. Two sound absorbing panels 400 are provided on the left and right sides of the support panel 300. Each sound absorbing panel 400 is formed to have the shape of steps and thereby is in close contact with the support panel 300. The fitting protrusions 310 of the support panel 300 are inserted into the sound absorbing panel 400.

Figure 6:
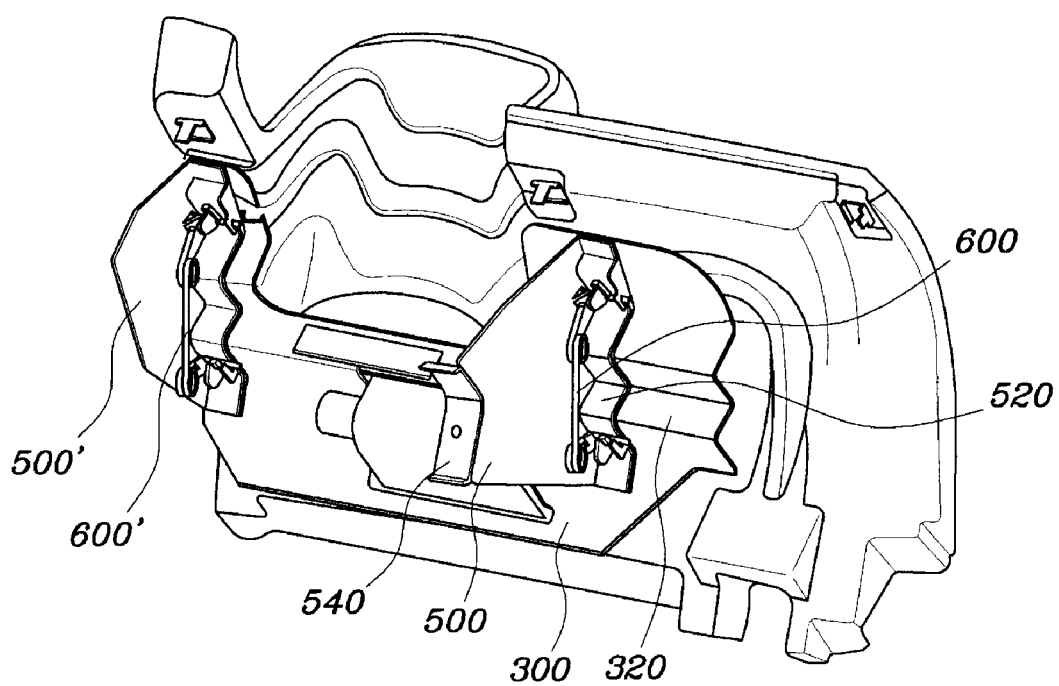
FIG. 6 is a perspective view illustrating the state in which a locking bracket is coupled to the sound absorbing panel of FIG. 5.

FIG. 6 illustrates the state in which the locking bracket is coupled to the sound absorbing panel. The locking bracket 500 is provided on one side of the support panel 300 and connected to the vehicle body 60. One end of the locking bracket 500 is formed to have the shape of steps 520 to be in close contact with the sound absorbing panel 400. Upper and lower fitting holes 521 are formed in the locking bracket 500 so that the fitting protrusions 310 of the support panel 300 pass through the upper and lower fitting holes 521. The other end 540 of the locking bracket 500 is formed to fit the vehicle body 60, with a sound absorbing panel attached to the other end 540. The support panel 300 and the locking bracket 500 are coupled to each other via the spring 600.

Figure 7:
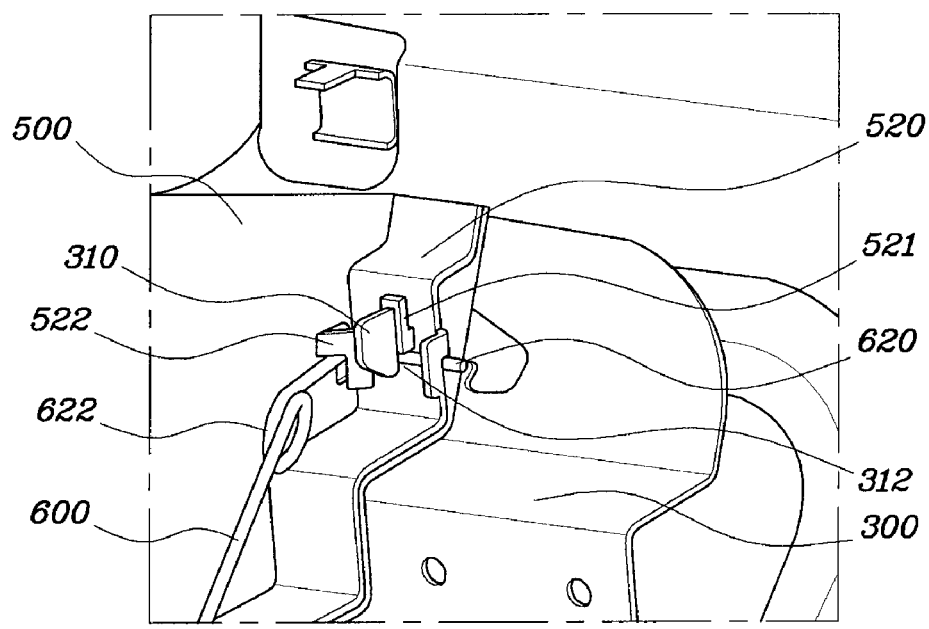
FIG. 7 is a perspective view illustrating the state in which the upper end of a spring is coupled to the locking bracket of FIG. 6.

FIG. 7 illustrates the upper end 620 of the spring. The fitting protrusion 310 of the support panel 300 passes through both the sound absorbing panel 400 and the locking bracket 500 and thereafter protrude out therefrom, with a locking groove 312 formed in the fitting protrusion 310. Locking hooks 522 are provided around the fitting hole 521 of the locking bracket 500, and the upper end 620 of the spring 600 is supported by the locking groove 312 of the fitting protrusion 310 and the locking hooks 522. Further, the spring 600 is provided with a bent part 622, thus maintaining elasticity.

Figure 8:
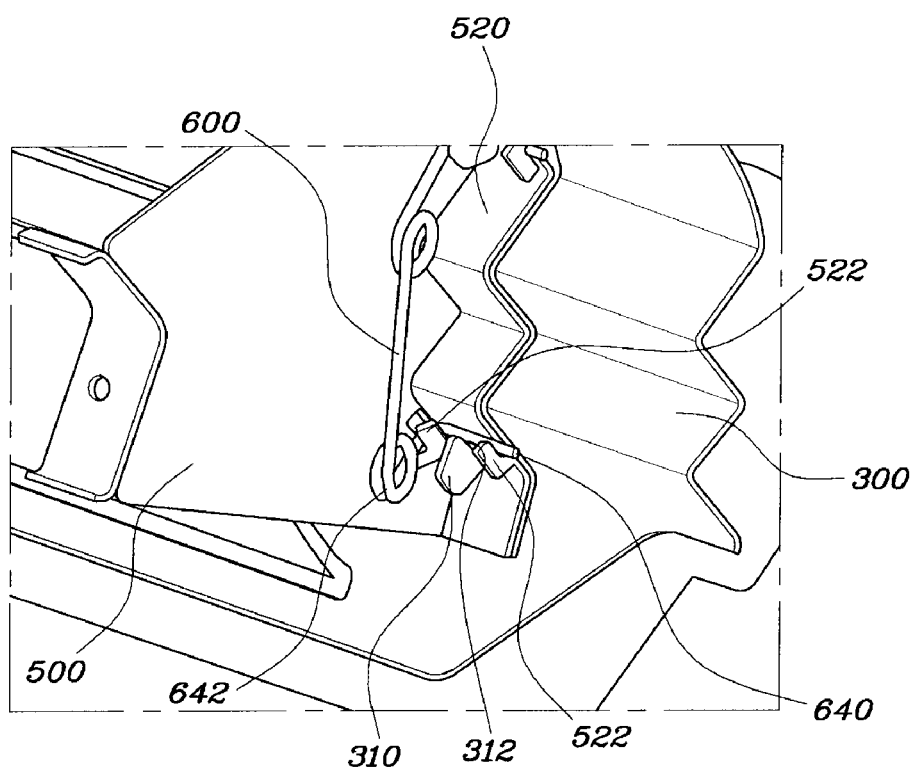
FIG. 8 is a perspective view illustrating the state in which the lower end of the spring is coupled to the locking bracket of FIG. 6.

FIG. 8 illustrates the lower end 640 of the spring. Like the upper end 620 of the spring 600, the lower end 640 of the spring 600 is supported by the locking groove 312 of the fitting protrusion 310 and the locking hooks 522, with a bent part 642 formed on the lower end 640 of the spring 600. The upper and lower ends 620 and 640 of the spring 600 are elastically pulled while being supported by the upper and lower fitting protrusions 310 and the locking hooks 522. As the spring 600 is pulled, the support panel 300, the sound absorbing panel 400 and the locking bracket 500 come into close contact with each other.

Figure 9:
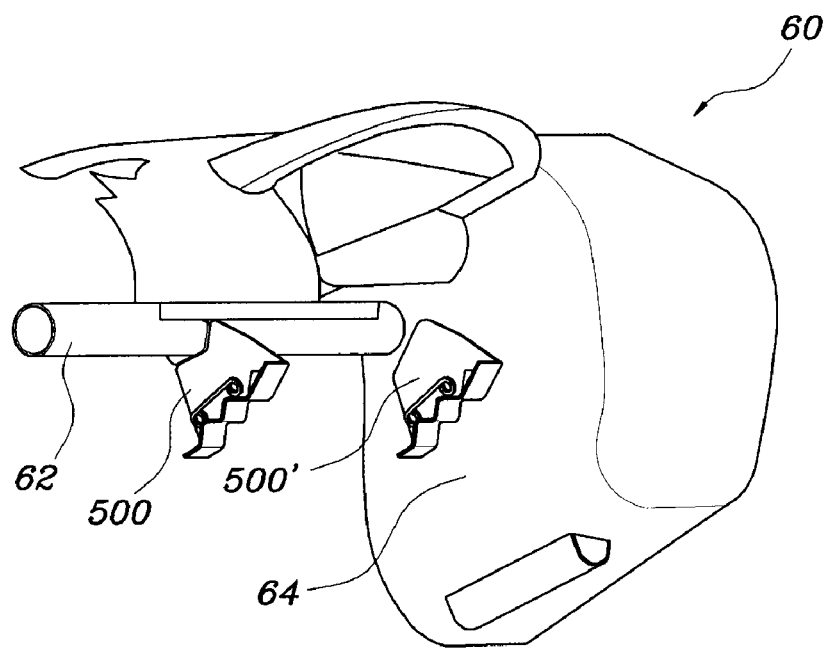
FIG. 9 is a perspective view illustrating the state in which the locking bracket of FIG. 6 is coupled to a vehicle body.

FIG. 9 illustrates the state in which both locking brackets are secured to the vehicle body. The locking brackets may be secured to the center instrument panel of the vehicle body or a cowl cross member. In the exemplary embodiments illustrated in the drawings, the right locking bracket 500' is secured to the center instrument panel 64 of the vehicle body 60, while the left locking bracket 500 is secured to the cowl cross member 62 so as to be coupled to the vehicle body 60. Thus, the lower crash pad 100 is coupled to the support panel, the sound absorbing panels and the locking brackets. The locking brackets are secured to the vehicle body. When a crash happens in the state where the knee protection device is mounted to the vehicle body, the lower crash pad 100 is inflated forwards.

Figure 10:
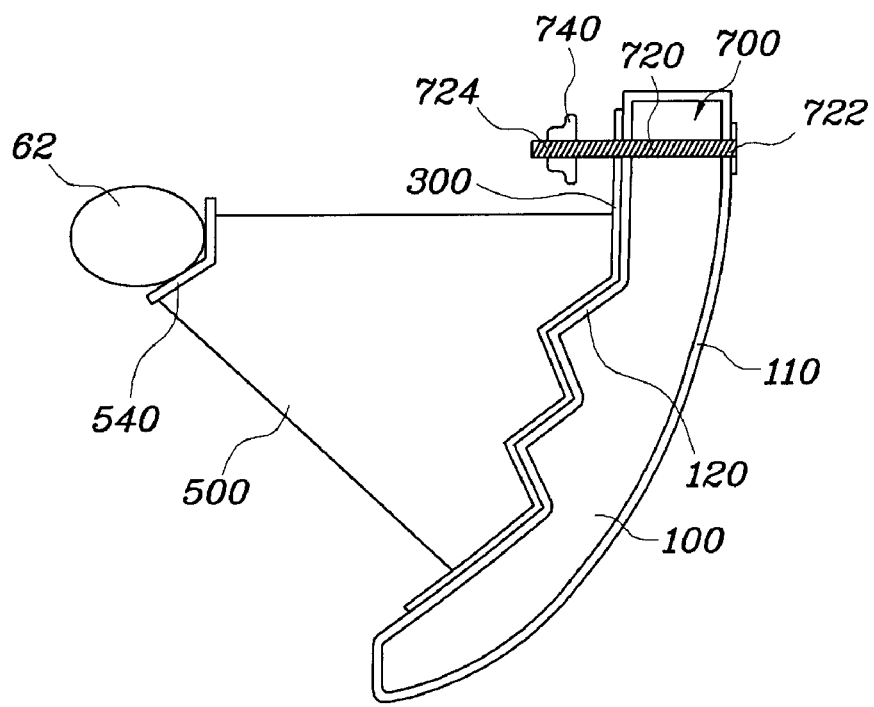
FIG. 10 is a perspective view illustrating the state in which an inflation limit unit is coupled to the lower crash pad of FIG. 6.

FIG. 10 illustrates the inflation limit unit of the lower crash pad. The inflation limit unit 700 includes an insert member 720 and a stopper 740. One end 722 of the insert member 720 is inserted into the lower crash pad 100 to be secured thereto. The stopper 740 is provided on the other end 724 of the insert member 720, thus limiting the inflation thickness of the lower crash pad 100. In a detailed description, the inflation limit unit 700 includes the rod-shaped insert member 720 and the stopper 740. After one end 722 of the rod-shaped insert member 720 passes through the support panel 300 and the rear surface 120 of the lower crash pad 100, one end 722 is secured to the front surface 110 of the lower crash pad 100. The stopper 740 is fastened to the other end 724 of the insert member 720 in a screw-type fastening method and stopped by the support panel 300 when the lower crash pad 100 inflates, thus limiting the inflation thickness of the lower crash pad 100.

The lower crash pad 100 is inflated forwards while the creases 124 formed on the upper end of the rear surface 120 of the lower crash pad 100 are smoothed out. The inflation limit unit 700 is mounted to the upper end of the lower crash pad 100 to limit the inflation of the upper end, thus preventing the lower crash pad 100 from excessively protruding out and preventing the lower crash pad 100 from striking a passenger's knees. When the lower crash pad 100 is inflated, one end 722 of the insert member 720 moves together with the front surface 110 of the lower crash pad 100, and the stopper 740 provided on the other end 724 of the insert member 720 is stopped by the support panel 300, thus limiting the forward moving distance of the front surface 110 of the lower crash pad 100 from the rear surface 120.

The stopper 740 is fastened to the other end 724 of the insert member 720 in a screw-type fastening method, thus adjusting the inflation thickness of the lower crash pad 100, therefore allowing the knee protection device to be universally used regardless of the kind of vehicles.

The knee protection device of the present invention protects a passenger's knees and restricts the behaviour of the passenger's body, thus reducing injury to other body parts. The out of position (OOP) test shows that an injury prevention effect for the breast region is improved by 56% and an injury prevention effect for the neck region is improved by 10%. Further, the SLED test shows that injury prevention effects for the head region, the breast region and the neck region are improved by 40%, 10%, and 80%, respectively. Further, the OBLIQUE SLED test shows that injury prevention effects for the head region, the breast region and the neck region are improved by 100%, 25%, and 130%, respectively. Furthermore, the new car assessment program (NCAP) SLED test shows that injury prevention effects for the head region and the breast region are improved by 10% and 15%, respectively.

As described above, the present invention provides a knee protection device for a vehicle, in which the function of a knee bolster is added to a lower crash pad, thus reducing the number of parts and reducing manufacturing costs.

Further, the present invention provides a knee protection device for a vehicle, in which a lower crash pad is made of a soft material, thus effectively absorbing shocks applied to the knees, and which limits the inflation thickness of the lower crash pad, thus preventing the lower crash pad from striking the knees in the initial stage of a crash.

Furthermore, the present invention provides a knee protection device for a vehicle, which limits the inflation thickness of a lower crash pad such that the thickness is variable, thus being applicable to various kinds of vehicles, and being easy to change the setting of the device. For convenience in explanation and accurate definition in the appended claims, the terms "up" or "upper", "lower", and "forward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A knee protection device for a vehicle, including,
   a lower crash pad including an internal space enclosed by a front surface and a rear surface, the internal space communicating with an inflator, wherein the rear surface is formed to be folded by a plurality of creases, and the front surface is configured to be inflated forwards while the rear surface is smoothed out with unfolding of the creases during gas deployment by the inflator, thus protecting a passenger's knees;
   a mounting unit provided on the rear surface of the lower crash pad and coupled to a vehicle body; and
   an inflation limit unit connected between the front surface and the rear surface of the lower crash pad, and limiting a forward moving distance of the front surface from the rear surface when the lower crash pad inflates;
   wherein the mounting unit includes,
      a support panel installed to be in close contact with the rear surface of the lower crash pad; and
      a locking bracket coupling the support panel to the vehicle body;
   wherein the plurality of creases are provided on an upper portion of the rear surface of the lower crash pad, a lower portion of the rear surface is formed in a stepped shape, the support panel is formed in a stepped shape and is in close contact with the lower portion of the rear surface, and the locking bracket is installed to be in close contact with the support panel, with an end of the locking bracket being formed in a stepped shape corresponding to the stepped shape of the support panel; and
   wherein upper and lower fitting protrusions each having a locking groove are provided on the support panel and pass through corresponding upper and lower fitting holes of the locking bracket, and a spring is installed between the upper and lower fitting protrusions and is supported and pulled at each of opposite ends thereof by the locking groove, thus coupling the support panel with the locking bracket.

2. The knee protection device as set forth in claim 1, wherein the plurality of creases are formed on an upper portion of the rear surface.

3. The knee protection device as set forth in claim 1, wherein the rear surface has a predetermined curvature so that the lower crash pad is inflated forwards in a fan shape during gas deployment by the inflator.

4. The knee protection device as set forth in claim 3, wherein the front surface of the lower crash pad is formed to have a predetermined curvature.

5. The knee protection device as set forth in claim 1, wherein the front surface of the lower crash pad is formed to have a predetermined curvature.

6. The knee protection device as set forth in claim 1, wherein the lower crash pad is made up of thermoplastic elastomer.

7. The knee protection device as set forth in claim 1, wherein the inflator and the mounting unit are mounted to a rear portion of the rear surface.

8. The knee protection device as set forth in claim 1, wherein the inflation limit unit includes,
   an insert member, a first end of which is fastened to the front surface and a second end of which is inserted into and adjustably mounted to the rear surface, and
   a stopper provided on the second end of the insert member and limiting an inflation thickness between the front and rear surfaces of the lower crash pad.

9. The knee protection device as set forth in claim 1, wherein at least a locking bracket is provided on each of opposite sides of the support panel and coupled to the vehicle body.

10. The knee protection device as set forth in claim 1, wherein the inflation limit unit includes,
    a rod-shaped insert member, a first end of which is fastened to the front surface and a second end of which passes through the rear surface and the support panel of the lower crash pad and mounted to the support panel, and
    a stopper adjustably fastened to the second end of the insert member in a screw-type fastening method, and stopped by the support panel when the lower crash pad is inflated, thus limiting an inflation thickness between the front and rear surfaces.

11. The knee protection device as set forth in claim 1, wherein a sound absorbing panel is provided between the support panel and the locking bracket so as to prevent noise from being generated.

12. The knee protection device as set forth in claim 1, wherein a locking hook is provided at a position around each of the fitting holes of the locking bracket, and an end of the spring is supported and pulled by the locking groove of each of the fitting protrusions and the locking hook.

* * * * *